US012573944B2

(12) United States Patent
　　Gupta

(10) Patent No.:　US 12,573,944 B2
(45) Date of Patent:　Mar. 10, 2026

(54) SYSTEMS AND METHODS FOR OPERATING PFC CIRCUITS IN DISCONTINUOUS/CRITICAL CONDUCTION MODES

(71) Applicant: Navitas Semiconductor Limited, Dublin (IE)

(72) Inventor: Milind Gupta, San Jose, CA (US)

(73) Assignee: Navitas Semiconductor Limited, Dublin (IE)

( * ) Notice: Subject to any disclaimer, the term of this patent is extended or adjusted under 35 U.S.C. 154(b) by 153 days.

(21) Appl. No.: 18/437,182

(22) Filed: Feb. 8, 2024

(65) Prior Publication Data

US 2025/0260312 A1　Aug. 14, 2025

(51) Int. Cl.
H02M 1/42 (2007.01)
H02M 1/08 (2006.01)

(52) U.S. Cl.
CPC .............. H02M 1/42 (2013.01); H02M 1/08 (2013.01)

(58) Field of Classification Search
CPC ........ H02M 1/42; H02M 1/08; H02M 1/0025; H02M 1/4225
See application file for complete search history.

(56) References Cited

U.S. PATENT DOCUMENTS

| | | | | |
|---|---|---|---|---|
| 6,518,738 | B1 * | 2/2003 | Wang ..................... | H02M 3/156 |
| | | | | 323/272 |
| 8,120,347 | B1 * | 2/2012 | Cao ...................... | H02M 1/4225 |
| | | | | 323/284 |
| 9,584,009 | B2 * | 2/2017 | Tan ...................... | H02M 1/4225 |
| 10,999,905 | B2 * | 5/2021 | Eum .................... | H05B 45/375 |
| 12,308,735 | B2 * | 5/2025 | Gupta .................... | H02M 1/08 |
| 2010/0110739 | A1 * | 5/2010 | Nishikawa .......... | H02M 1/4225 |
| | | | | 363/124 |
| 2019/0028022 | A1 * | 1/2019 | Kim ........................ | H02M 7/06 |
| 2019/0260289 | A1 * | 8/2019 | Leisten ............... | H02M 1/4225 |

* cited by examiner

*Primary Examiner* — Kyle J Moody
(74) *Attorney, Agent, or Firm* — FisherBroyles, LLP

(57) ABSTRACT

A method of operating a PFC circuit. The method includes receiving an input voltage at an input terminal, controlling a current in an inductor via a first switch having a drain terminal, a source terminal and a gate terminal, where the inductor is coupled between the input terminal and the drain terminal and where during an on-time of the first switch the current in the inductor increases from substantially zero to a peak, during a first off-time of the first switch the current in the inductor decreases from the peak to substantially zero, and during a second off-time of the first switch the current in the inductor is substantially zero, generating a first reference voltage that is inversely proportional to a sum of the on-time and the first off-time of the first switch, and controlling the on-time of the first switch in response to the first reference voltage.

20 Claims, 6 Drawing Sheets

SYSTEMS AND METHODS FOR OPERATING PFC CIRCUITS IN DISCONTINUOUS/CRITICAL CONDUCTION MODES

FIELD

The present disclosure relates to power factor correction (PFC) circuits, and more particularly to PFC circuits operating in discontinuous/critical conduction modes.

BACKGROUND

Power supplies can be used to convert alternating current ("ac") power provided by an electrical outlet into usable direct current ("dc") power for an electrical device. One important consideration for power supply design is how efficiently power is delivered to the power supply. To improve power delivery efficiency a power factor correction (PFC) circuit may be used in the power supply, which attempts to shape the current waveform as closely to the shape of the voltage waveform.

Typically, PFC circuits are designed to include a power switch that is controlled to switch between an off state and on state in order to transform a distorted input current waveform transmitted from the distribution line into a more ideal current waveform that resembles the shape of the input voltage waveform. More specifically, the power switch can be coupled to an energy transfer element to transfer energy to the output of the power supply. However, the PFC circuit may experience switching losses during operation. Additional losses may also be realized in the energy transfer element.

Boost topology can be used for PFC since the input current is an inductor current. To have a good power factor, the input current can be adapted to be proportional to the input voltage and follow the shape of the input mains voltage.

SUMMARY

In some embodiments, a method of operating a power factor correction (PFC) circuit is disclosed. The method includes receiving an input voltage at an input terminal; controlling a current in an inductor via a first switch having a drain terminal, a source terminal and a gate terminal, where the inductor is coupled between the input terminal and the drain terminal and where: during an on-time of the first switch the current in the inductor increases from substantially zero to a peak; during a first off-time of the first switch the current in the inductor decreases from the peak to substantially zero; and during a second off-time of the first switch the current in the inductor is substantially zero; generating a first reference voltage that is inversely proportional to a sum of the on-time and the first off-time of the first switch; and controlling the on-time of the first switch in response to the first reference voltage such that the on-time is proportional to a ratio of a sum of the on-time and the first and second off-times to the sum of the on-time and the first off-time.

In some embodiments, generating the first reference voltage includes: generating a first voltage that is proportional to the sum of the on-time and the first off-time of the first switch; generating a second voltage by comparing the input voltage to a second reference voltage; and generating the first reference voltage by setting equal the first voltage to the second voltage.

In some embodiments, generating the first voltage includes: generating a current signal corresponding to the first reference voltage; and transmitting the current signal to a second switch that is arranged to switch at a switching cycle that is proportional to sum of the on-time and the first off-time of the first switch.

In some embodiments, generating the first voltage further includes: generating a voltage signal corresponding to the first reference voltage; and transmitting the voltage signal to a first capacitor coupled to the second switch.

In some embodiments, controlling the on-time of the first switch includes: generating a sawtooth signal; and comparing the sawtooth signal to the first reference voltage to generate a control signal for the first switch.

In some embodiments, generating the second voltage includes: generating an inverse ratio of a square of the input voltage; and multiplying the inverse ratio of the square of the input voltage to a third voltage that corresponds to the input voltage.

In some embodiments, a method of operating a power factor correction (PFC) circuit is disclosed. The method includes: receiving an input voltage at an input terminal; controlling a current in an inductor via a first switch having a drain terminal, a source terminal and a gate terminal, where the inductor is coupled between the input terminal and the drain terminal and where: during an on-time of the first switch the inductor is charged with a quantity of energy; during a first off-time of the first switch the quantity of energy is discharged from the inductor; and during a second off-time of the first switch the inductor remains discharged; generating a first reference voltage that is inversely proportional to a sum of the on-time and the first off-time of the first switch; and controlling the on-time of the first switch in response to the first reference voltage such that the on-time is proportional to a ratio of a sum of the on-time and the first and second off-times to the sum of the on-time and the first off-time.

In some embodiments, the current signal is a first current signal, where generating the first current signal includes: generating a second current signal, by a transconductance amplifier, corresponding to the first reference voltage; and generating the first current signal, by a current mirror, corresponding to the second current signal.

In some embodiments, a method of operating a power factor correction (PFC) circuit is disclosed. The method includes: receiving an input voltage at an input terminal; controlling a current in an inductor via a first switch having a drain terminal, a source terminal and a gate terminal, where the inductor is coupled between the input terminal and the drain terminal and where: during an on-time of the first switch the inductor is charged to a first energy state; during a first off-time of the first switch the inductor is discharged to a second energy state; and during a second off-time of the first switch the inductor remains at the second energy state; generating a first reference voltage that is inversely proportional to a sum of the on-time and the first off-time of the first switch; and controlling the on-time of the first switch in response to the first reference voltage such that the on-time is proportional to a ratio of a sum of the on-time and the first and second off-times to the sum of the on-time and the first off-time.

DETAILED DESCRIPTION

Circuits and related techniques disclosed herein relate generally to power converters. More specifically, circuits, devices and related techniques disclosed herein relate to power factor correction (PFC) circuits that operate in discontinuous/critical conduction modes and that can operate with increased efficiency by employing circuits and techniques disclosed herein. In some embodiments, a method of operating a PFC circuit may include receiving an input voltage at an input terminal, controlling a current in an inductor via a first switch having a drain terminal, a source terminal and a gate terminal, where the inductor is coupled between the input terminal and the drain terminal and where: during an on-time of the first switch the current in the inductor increases from substantially zero to a peak; during a first off-time of the first switch the current in the inductor decreases from the peak to substantially zero; and during a second off-time of the first switch the current in the inductor is substantially zero. The method further includes generating a first reference voltage that is inversely proportional to a sum of the on-time and the first off-time of the first switch, and controlling the on-time of the first switch in response to the first reference voltage such that the on-time is proportional to a ratio of a sum of the on-time and the first and second off-times to the sum of the on-time and the first off-time.

In some embodiments, the PFC circuits can utilize one or more gallium nitride (GaN) based and/or silicon carbide based and/or silicon based devices. By utilizing compound semiconductor devices, embodiments of the present disclosure can enable the power converter to operate at relatively higher frequencies with relatively higher efficiencies than traditional silicon-based circuits. In the following description, numerous specific details are set forth in order to provide a thorough understanding of the present disclosure. It will be apparent, however, to one having ordinary skill in the art that the specific detail need not be employed to practice the present disclosure. Well-known methods related to the implementation have not been described in detail in order to avoid obscuring the present disclosure. Various inventive embodiments are described herein, including methods, processes, systems, devices, and the like.

Figure 1:
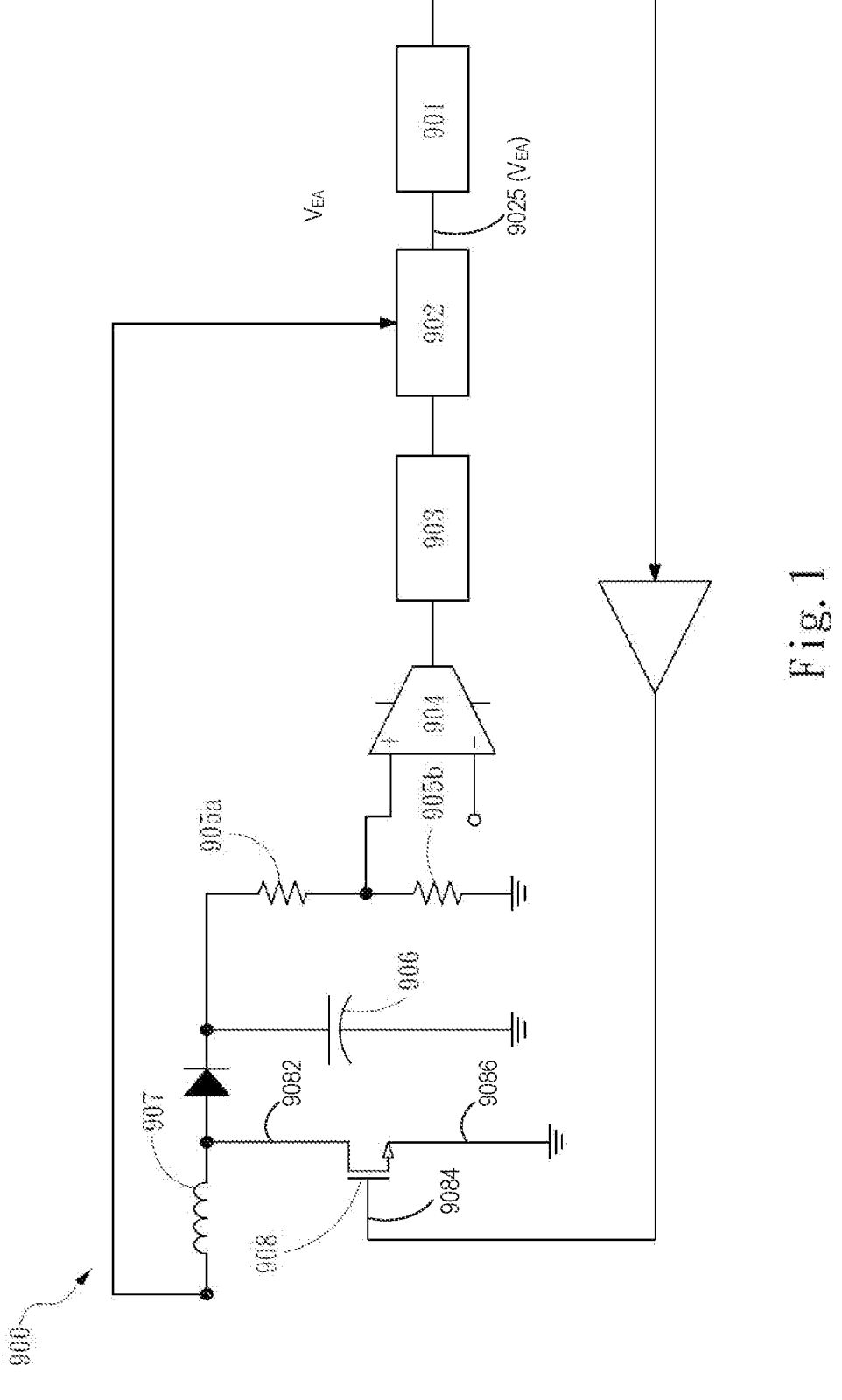
FIG. 1 shows a schematic diagram of an example of power factor correction system in accordance with some embodiments of the present disclosure.

FIG. 1 shows a schematic diagram of an example of power factor correction system in accordance with some embodiments of the present disclosure. The system 900 includes a power factor correction (PFC) circuit 901, a square divider 902, a compensation unit 903, an amplifier 904, two resistors 905a, 905b, a capacitor 906, an inductor 907 and a switch 908, having a drain terminal 9082, a gate terminal 9084 and a source terminal 9086. The square divider 902 may have an output node 9025 that is coupled to the PFC circuit 901.

Figure 3:
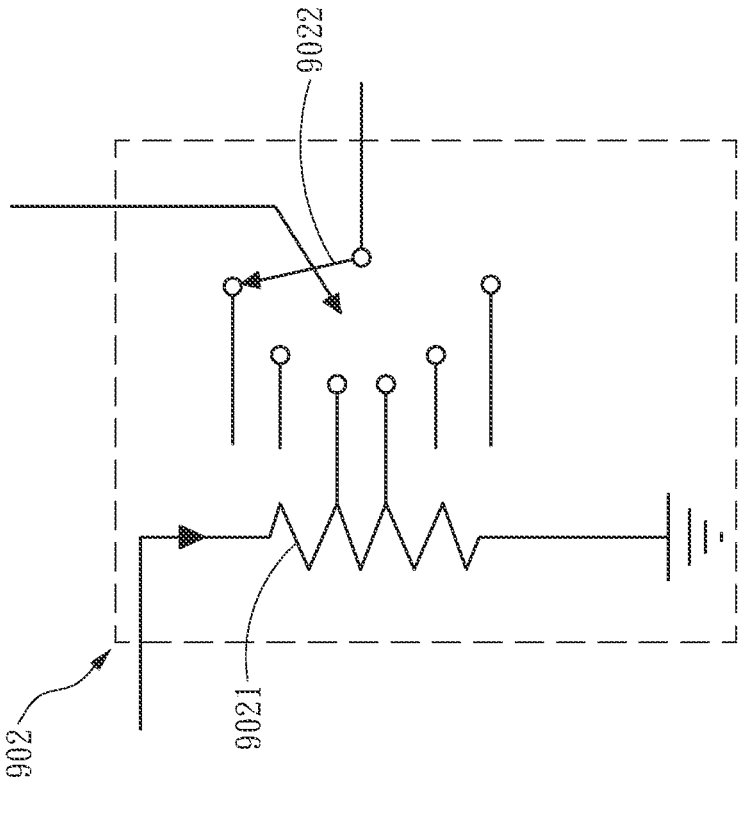
FIG. 3 shows a schematic diagram of an example of the multiplier circuit in FIG. 1.
Figure 2:
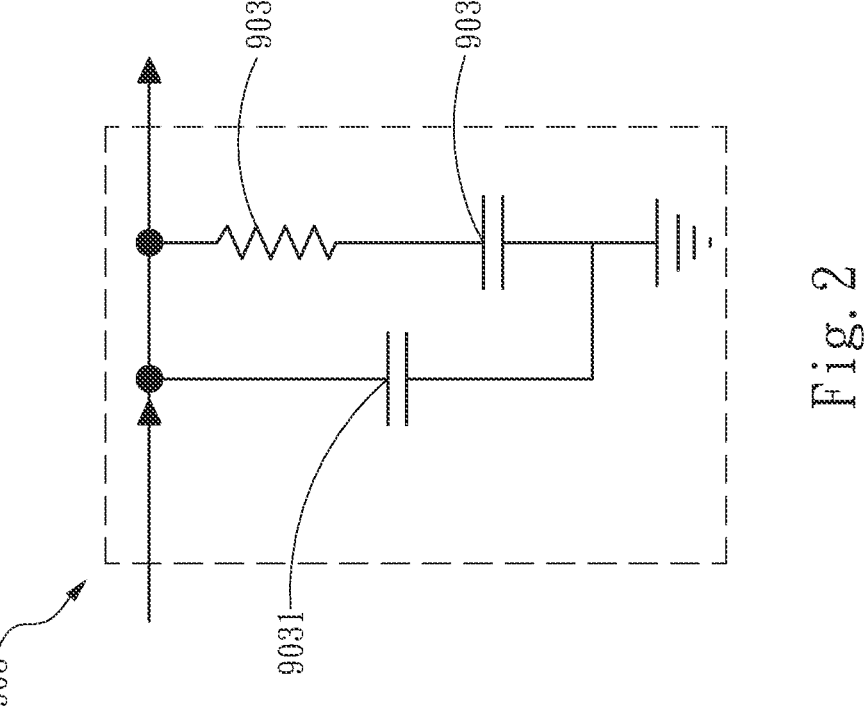
FIG. 2 shows a schematic diagram of an example of the compensation circuit in FIG. 1.

FIG. 2 shows an example of the compensation unit 903 and FIG. 3 shows an example of the square divider 902. The compensation unit 903 includes two capacitors 9031, 9032 and a resistor 9033. The square divider 902 includes a resistor 9021 and a switch 9022. The square divider 902 is configured to generate the reciprocal of a voltage squared. In the illustrated embodiment, the square divider 902 may be operated in discrete steps, while in certain embodiments it may be operated in a continuous fashion.

The PFC circuit may operate by repeated cycles of charging and discharging an inductor. Each operational cycle includes a charging period during which current in the inductor is transferring energy from a power source into the inductor, and a discharging period during which current in the inductor is transferring energy from the inductor to a load.

The charging period and the discharging period of the operational cycle constitute the operational cycle, generally the PFC circuit is operating in either a Continuous Conduction Mode (CCM) or a Boundary Conduction Mode (BCM). In both CCM and BCM, the charging period of each cycle is immediately followed by the discharging period, and the discharging period of an operational cycle is immediately followed by the charging period of the next operational cycle.

In CCM, the current in the inductor does not drop to zero during the operational cycle, while in BCM the current drops to zero at the end of the discharge period of each operational cycle, and then immediately resumes when the charging period of the subsequent operational cycle begins. BCM may be said to operate at the boundary between CCM and Discontinuous Conduction Mode (DCM).

Discontinuous Conduction Mode (DCM) occurs when the operational cycle may include a substantial period during which the inductor is neither being charged or discharged, during which the net inductor current is zero. Thus, in a PFC circuit operating in DCM, each operational cycle includes a charging period, a discharging period, and a zero current period.

Figure 4:
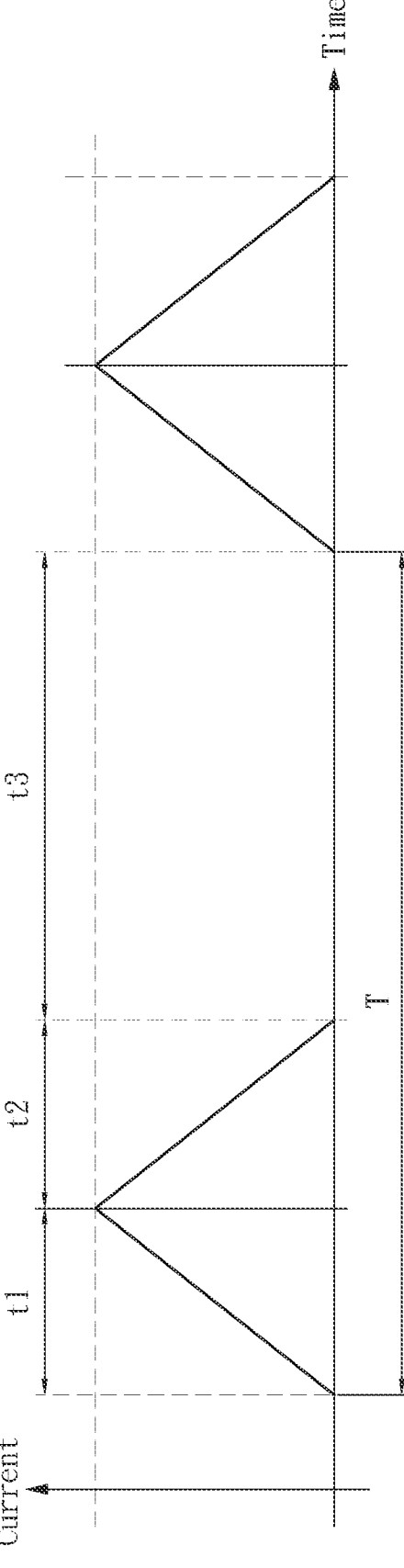
FIG. 4 shows an inductor current in the boost converter.

FIG. 4 shows an inductor current in a boost converter when operating under the DCM. For the boost converter operating in the Critical Conduction Mode (CrM), t3=0 or T=t1+t2. The average input current in every switching cycle is calculated from the following expression:

$$I_{IN} = V_{IN} \frac{t_1(t_1 + t_2)}{2LT}$$

L is the inductance of the inductor in the boost converter. $I_{IN}$ is the average input current in the cycle and $V_{IN}$ is the average input voltage during the cycle.

To achieve the average input current proportional to the average input voltage, it is ideal to make $$\frac{t_1(t_1 + t_2)}{2T}$$

constant (the inductance of the inductor is assumed to be a constant). That is, $$\frac{t_1(t_1 + t_2)}{2T} = C.$$

Then $$t_1 = 2C\frac{T}{t_1 + t_2},$$

where $T=t1+t2+t3$ and $t3=0$ in CrM or BCM. In practice, however, the value of C involves multiple components in the PFC circuit and may be varied or affected due to the manufacture process even for the same circuit. If the turn-on duration (t1) could be recursively set to take the form of above-mentioned equation, then the power factor would be greatly improved.

In some embodiments, a PFC circuit is disclosed that can operate such that the variation of the constant C in the above-mentioned expression could be minimized. That is, the linear relation would be improved and more consistent.

In the present disclosure, the power factor correction circuit operated under the CrM or DCM is configured to adjust the turn-on duration $T_{on}$ substantially in accordance with the following relationship:

$$T_{on} = \frac{T}{T_{on} + T_{off}} \frac{\text{first parameter}}{\text{second parameter}}$$

The first parameter in numerator includes at least one first process-dependent parameter and the second parameter in denominator includes at least one second process-dependent parameter. For example, the first parameter maybe a single process-dependent parameter or multiplication of two or more different process-dependent parameters with or without other factors. Similarly, the second parameter maybe a single process-dependent parameter or multiplication of two or more different process-dependent parameters with or without other factors.

The first process-dependent parameter and the second process-dependent parameter are equivalent electrical characteristics associated with different components in the power factor correction circuit. For example, the first process-dependent parameter and the second process-dependent parameter may include a first resistance and a second resistance of different components (a first component and a second component) in the circuit. The resistance may be replaced as capacitance, transconductance coefficient, voltage or the likes. By following the form of the above relationship, the circuit component factors appear in the numerator and denominator will be equal, such that the influence from the process variation can be minimized.

Figure 5:
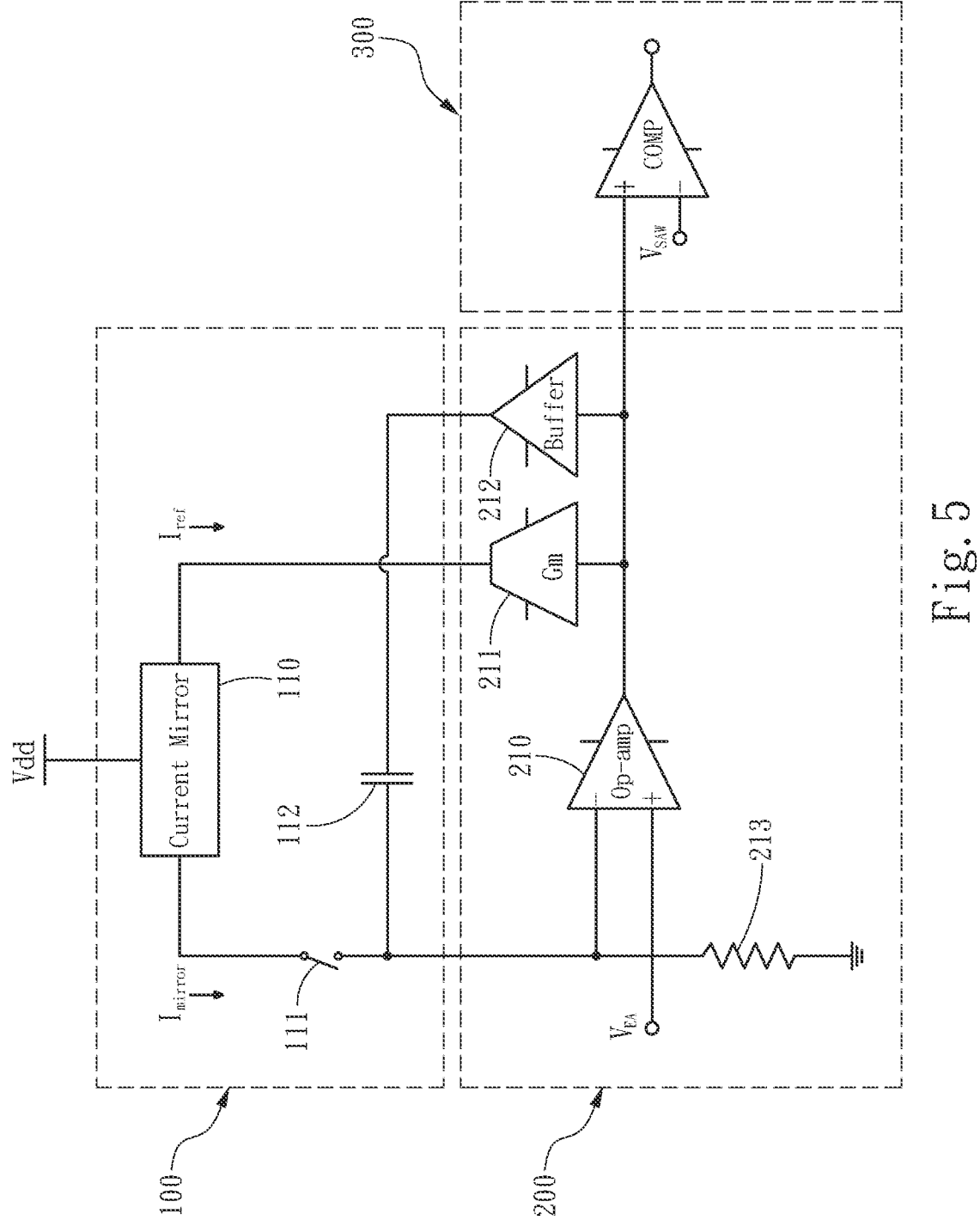
FIG. 5 shows a schematic diagram of an example of power factor correction circuit in accordance with some embodiments of the present disclosure.

FIG. 5 illustrates the PFC circuit 901 according to some embodiments. The PFC circuit may be used for a boost converter and can include a feedback circuit 100, an amplification circuit 200 and a comparator 300.

The amplification circuit 200 amplifies an error associated with an output voltage from the feedback circuit 100 and drives the feedback circuit 100. The feedback circuit 100 converts an input current based on a time period of a turn-on duration $T_{on}$ and a turn-off duration Toff of the boost converter into the output voltage with an average. The comparator 300 generates the turn-on duration $T_{on}$ based on the output voltage from the amplification circuit 200.

Figure 7:
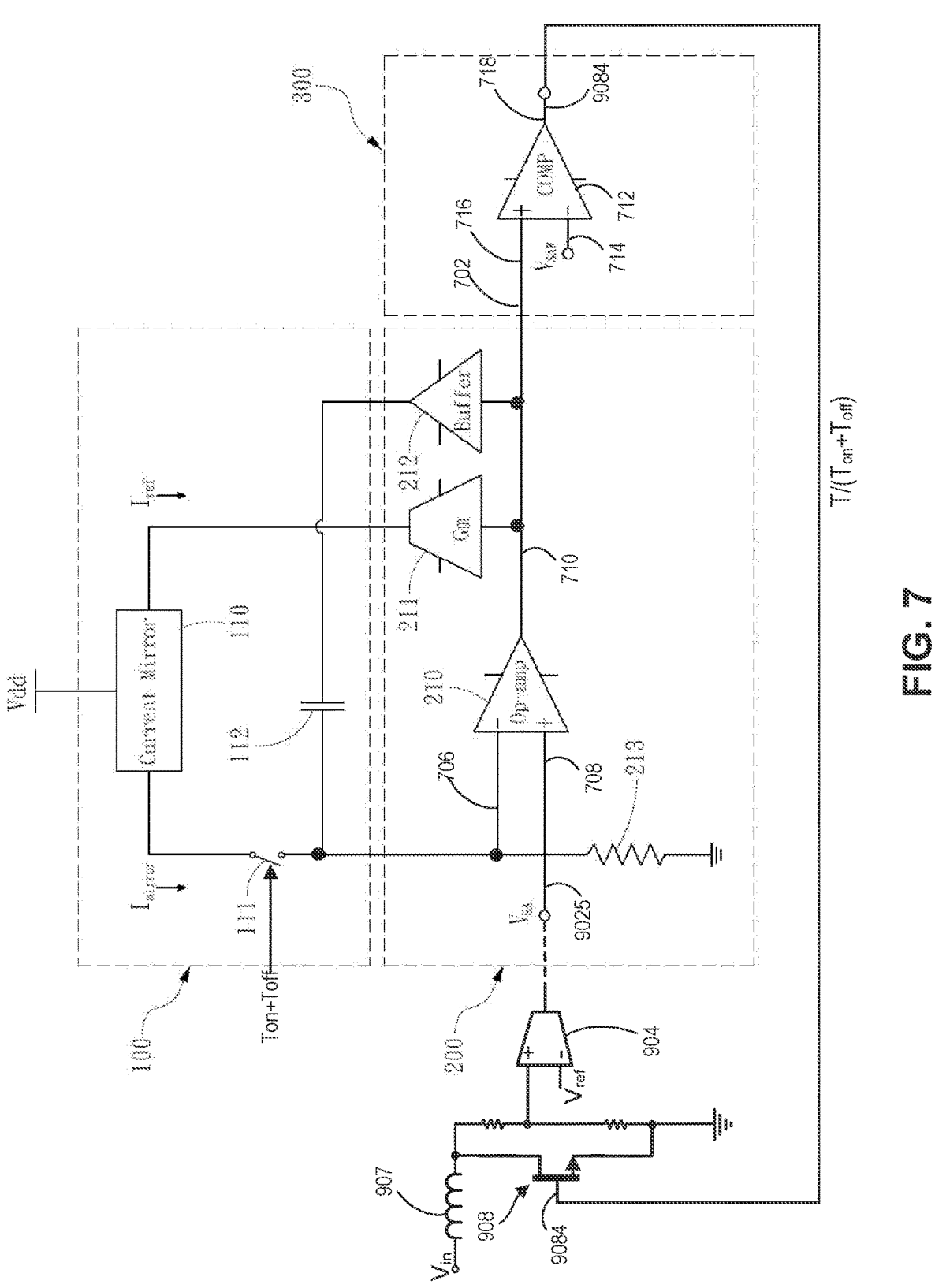
FIG. 7 shows a schematic block diagram of an example of power factor correction circuit in accordance with certain embodiments of the present disclosure.

In some embodiments, the feedback circuit 100 may comprise a current mirror 110, a switch 111 and a capacitor 112. The current mirror 110 receives a supply voltage Vdd and receives a reference current $I_{ref}$ from the amplification circuit 200, which is mirrored to a current $I_{mirror}$ flowing through the switch 111. As shown in FIG. 7, the amplification circuit 200 may include an operational amplifier 210 having an inverting input terminal 706, a non-inverting input terminal 708 and an output terminal 710. The output terminal 710 may be coupled to a transconductance amplifier 211 and to a buffer circuit 212. The inverting input terminal 706 may be coupled to an impedance element 213. The output terminal 710 may also be coupled to a comparator 712 having an inverting input terminal 714, a non-inverting input terminal 716 and an output terminal 718. In some embodiments, a sawtooth signal may be applied to the inverting input terminal 714. In various embodiments, the output terminal 718 may be coupled to the gate terminal 9084.

A first reference voltage 702 may be generated by the operational amplifier 210 at the output terminal 710 and be applied to the non-inverting input terminal 716. The comparator 712 can use a sawtooth signal and compare it to the first reference voltage 702 and generate a control signal at its output terminal 718. The control signal can be transmitted to the gate terminal 9084 and control an on-time and an off-time of the switch 908. The first reference voltage 702 can be generated by the operational amplifier 210 by forcing a voltage at the inverting input terminal 706 to be equal to a voltage at the non-inverting input terminal 708, where the non-inverting input terminal 708 may be coupled to the output node 9025 that may have a voltage $V_{EA}$. The voltage at the inverting input terminal 706 can be generated by the current $I_{mirror}$ that passes through a second switch 111. The second switch 111 may be switching at a switching cycle with a time period of Ton+Toff. The current $I_{mirror}$ can generate the voltage at the inverting input terminal 706 through a combination with the impedance element 213.

The feedback circuit 100 is capable of generating an average voltage on the impedance element 213 by outputting an output current with an average achieved by a capacitor 112. The combination of the current mirror 110 with the switch 111 and the capacitor 112 makes up an additional feedback path, such that the feedback path in the PFC circuit will not be eliminated when operates under the DCM.

Figure 6:
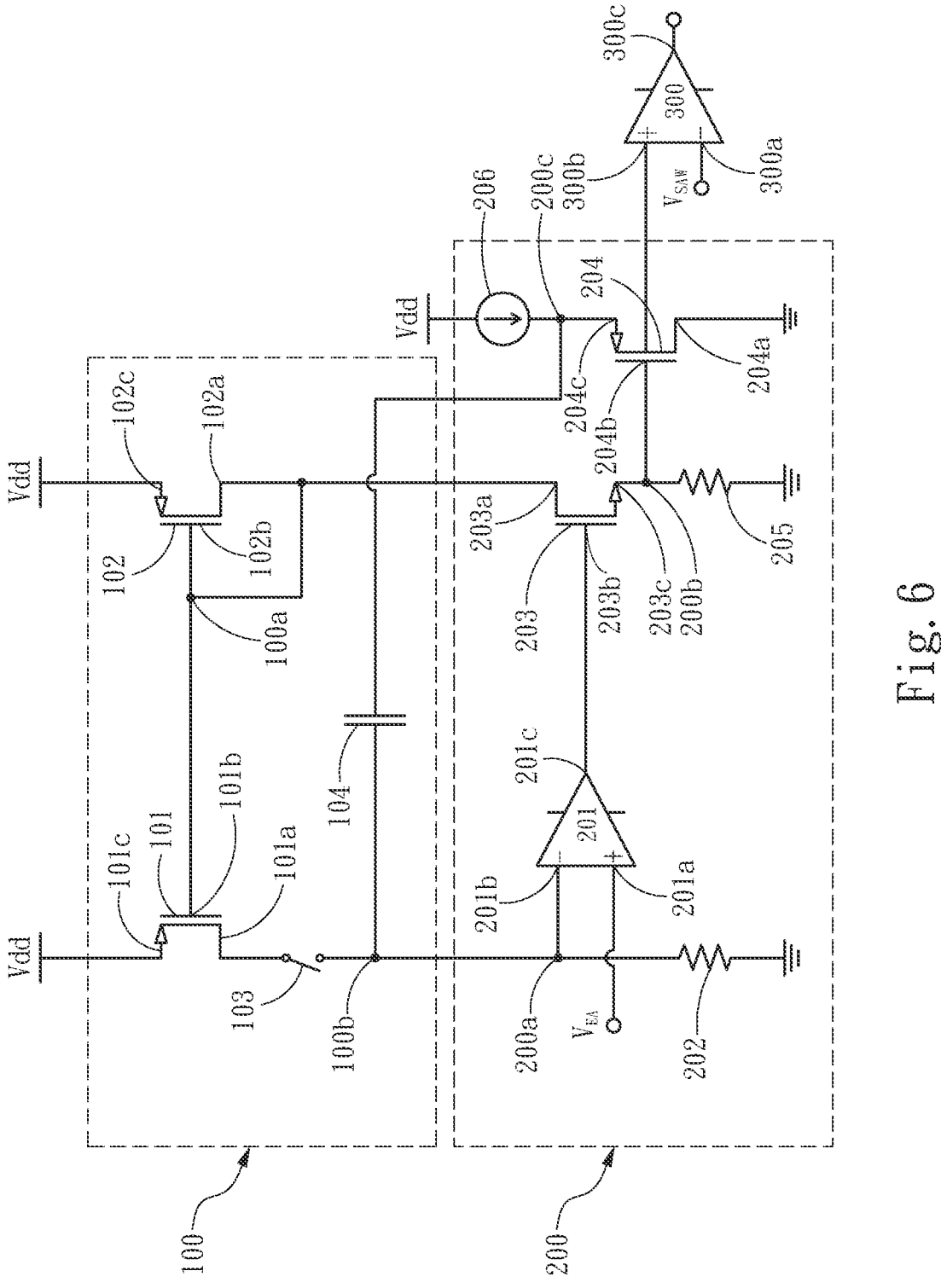
FIG. 6 shows a schematic diagram of an example of power factor correction circuit in accordance with some embodiments of the present disclosure.

As shown in the example depicted in FIG. 6, the feedback circuit 100 can include a first P-type transistor 101, a second P-type transistor 102, a switch 103 and the capacitor 104. The first P-type transistor 101 and the second P-type transistor 102 make up a current mirror, which reflects the current flowing through the second P-type transistor 102 and produces an output current to the switch 103. A ratio between the currents is determined by the W/L ratio of each of the transistors 101, 102. The first P-type transistor 101 has a drain terminal 101*a*, a gate terminal 101*b* and a source terminal 101*c*. The second P-type transistor 102 has a drain terminal 102*a*, a gate terminal 102*b* and a source terminal 102*c*. The source terminals 101*c*, 102*c* are coupled to the supply voltage respectively. The gate terminal 101*b* of the first P-type transistor 101 is connected to the gate terminal 102*b* of the second P-type transistor 102. A node 100*a* between the gate terminal 101*b* of the first P-type transistor 101 and the gate terminal 102*b* of the second P-type transistor 102 is connected to the drain terminal 102*a*. The switch 103 is coupled with the drain terminal 101*a* of the first P-type transistor 101, which is controlled by a control signal causing the switch 103 to be closed for the turn-on duration $T_{on}$ and the turn-off duration Toff. The combination of the first P-type transistor 101, the second P-type transistor 102 and the switch 103 are acted as a feedback path and the capacitor 104 form an additional feedback path.

The feedback circuit 100 comprises two feedback paths, a first feedback path of the first P-type transistor 101 and the second P-type transistor 102 is in discrete intervals and only active when the switch 103 is ON, while a second feedback path through the capacitor 104 is active all the time. This prevents the amplifier from saturating when the switch 103 is open. At the same time, the capacitor 104 helps average the discrete current signal from the other feedback path, so as to generate the averaged output current.

Since the feedback path through the first P-type transistor 101 and the second P-type transistor 102 is turned off during the dead time in the DCM, the additional feedback path is capable to ensure the feedback in the PFC circuit is not broken and an amplifier in the amplification circuit 200 does not saturate. The averaged output current of the feedback circuit 100 goes out from the node 100*b* and regulates a node 200*a* in the amplification circuit 200.

The amplification circuit 200 amplifies the error between the node 200*a* and an error amplifier output voltage (or called an error voltage $V_{EA}$) applied at a non-inverting input 201*a*. The output of the amplification circuit 200 is used to drive the feedback circuit 100 to minimize the error at the input of the op-amp.

The amplification circuit 200 comprises an operational amplifier 201, a first resistor 202, a N-type transistor 203, a third P-type transistor 204 and a second resistor 205 and a current source 206. The operational amplifier 201 has the non-inverting input 201*a*, an inverting input 201*b* and an output 201*c*. The non-inverting input 201*a* is applied with the error amplifier output voltage. In an example, the error amplifier output voltage is from the square divider 902 in FIG. 1. The inverting input 201*b* is connected to a node 100*b* between the capacitor 104 and the switch 103. The first resistor 202 is coupled with a node 200*a* between the inverting input 201*b* and the node 100*b*. The N-type transistor 203 has a drain terminal 203*a*, a gate terminal 203*b* and a source terminal 203*c*. The drain terminal 203*a* is coupled to the drain terminal 102*a* of the second P-type transistor 102. The gate terminal 203*b* is coupled to an output of the operational amplifier 201. The source terminal 203*c* is connected to ground through the second resistor 205. The third P-type transistor 204 has a drain terminal 204*a*, a gate terminal 204*b* and a source terminal 204*c*. The source terminal 204*c* is coupled to the current source 206. The gate terminal 204*b* is coupled between the source terminal 203*c* and the second resistor 205. The drain terminal 204*a* is connected to ground. The current source 206 is configured to generate a constant output current and the capacitor 104 of the feedback circuit 100 is coupled to a node 200*c* provided between an output of the current source 206 and third P-type transistor 204.

The feedback circuit 100 senses the current flowing through the second resistor 205 of the amplification circuit 200. The output voltage at node 200*b* is divided by the second resistor 205 to produce a current which acts as an input to the drain terminal 102*a* of the second P-type transistor 102 so as to form the feedback path. The amplification circuit 200 amplifies the error between the node 200*a* and an error amplifier output voltage applied at the non-inverting input 201*a*. As a result, the amplification circuit 200 drives the feedback circuit 100 with the minimized error at the input of the operational amplifier 201.

The comparator 300 can be used to generate the turn-on duration $T_{on}$ pulse width from the output of the amplification circuit 200. The comparator 300 has a non-inverting input 300*a*, an inverting input 300*b* and an output 300*c*. The non-inverting input 300*a* is coupled with a saw-tooth voltage ($V_{SAW}$). The inverting input 300*b* is coupled with the node 200*b* between the source terminal 203*c* and the second resistor 205. The output 300*c* generates an on-time control signal having the turn-on duration $T_{on}$ to control the switch 103.

In the illustrated embodiment, the power factor correction circuit operated under the CrM or DCM is configured to adjust the turn-on duration $T_{on}$ substantially in accordance with the following relationship:

$$T_{on} = \frac{T}{T_{on} + T_{off}} \frac{R_2 V_{EA}}{R_1 K}$$

$R_1$ represents resistance of the first resistor 202, $R_2$ represents resistance of the second resistor 205, $V_{EA}$ represents the error voltage coming from the square divider 902 in FIG. 1, and K represents slope of the voltage ramp of the saw-tooth voltage.

In some embodiments, PFC circuits can be operated such that they can follow the form of the above-mentioned relationship, the circuit component factors appear in the numerator and denominator are of same electrical characteristic (equivalent circuit parameters) in different circuit components such that the influence from the process variation can be minimized. In addition, the additional feedback path ensures the feedback in the PFC circuit is not broken and avoids the amplifier from saturation when operating in the DCM.

Although structures and techniques disclosed are described and illustrated herein with respect to some particular configurations of a PFC circuit, embodiments of the disclosure are suitable for use with other configurations of power converters. For example, techniques disclosed herein can be for other power converter configurations, such as, but not limited, flyback converters, ACF, AHB, and LLC converters.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary imple-mentation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, struc-tures, or characteristics may be combined in one or more examples and/or features.

In the preceding detailed description, numerous specific details have been set forth to provide a thorough understand-ing of claimed subject matter. However, it will be under-stood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

One of ordinary skill in the art will appreciate that other modifications to the apparatuses and methods of the present disclosure may be made for implementing various applica-tions of the methods and systems for enhanced area getter architecture for a wafer-level vacuum packaged uncooled focal plane array without departing from the scope of the present disclosure.

The examples and embodiments described herein are for illustrative purposes only. Various modifications or changes in light thereof will be apparent to persons skilled in the art. These are to be included within the spirit and purview of this application, and the scope of the appended claims which follow.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describ-ing particular embodiments only and is not intended to be limiting of the disclosure. As used herein, the singular forms "a", "an", and "the" are intended to include the plural forms as well, unless the context clearly indicates otherwise. It will be further understood that the terms "comprise", "compris-ing", "include", and/or "including" when used herein specify the presence of stated features, elements, and/or components, but do not preclude the presence or addition of one or more other features, elements, components, and/or groups thereof. The indefinite articles and the definite articles shall encompass both the plural and singular unless the opposite is clearly apparent from the context.

The invention claimed is:

1. A method of operating a power factor correction (PFC) circuit, the method comprising:
    receiving an input voltage at an input terminal;
    controlling a current in an inductor via a first switch having a drain terminal, a source terminal and a gate terminal, wherein the inductor is coupled between the input terminal and the drain terminal and wherein:
    during an on-time of the first switch the current in the inductor increases from substantially zero to a peak;
    during a first off-time of the first switch the current in the inductor decreases from the peak to substantially zero; and
    during a second off-time of the first switch the current in the inductor is substantially zero;
    generating a first reference voltage that is inversely pro-portional to a sum of the on-time and the first off-time of the first switch; and
    controlling the on-time of the first switch in response to the first reference voltage such that the on-time is proportional to a ratio of a sum of the on-time and the first and second off-times to the sum of the on-time and the first off-time.

2. The method of claim 1, wherein generating the first reference voltage comprises:
    generating a first voltage that is proportional to the sum of the on-time and the first off-time of the first switch;
    generating a second voltage by comparing the input voltage to a second reference voltage; and
    generating the first reference voltage by setting equal the first voltage to the second voltage.

3. The method of claim 2, wherein generating the first voltage comprises:
    generating a current signal corresponding to the first reference voltage; and
    transmitting the current signal to a second switch that is arranged to switch at a switching cycle that is propor-tional to sum of the on-time and the first off-time of the first switch.

4. The method of claim 3, wherein generating the first voltage further comprises:
    generating a voltage signal corresponding to the first reference voltage; and
    transmitting the voltage signal to a first capacitor coupled to the second switch.

5. The method of claim 2, wherein generating the second voltage comprises:
    generating an inverse ratio of a square of the input voltage; and multiplying the inverse ratio of the square of the input voltage to a third voltage that corresponds to the input voltage.

6. The method of claim 1, wherein controlling the on-time of the first switch comprises:

generating a sawtooth signal; and comparing the sawtooth signal to the first reference voltage to generate a control signal for the first switch.

7. A method of operating a power factor correction (PFC) circuit, the method comprising:

receiving an input voltage at an input terminal;

controlling a current in an inductor via a first switch having a drain terminal, a source terminal and a gate terminal, wherein the inductor is coupled between the input terminal and the drain terminal and wherein:

during an on-time of the first switch the inductor is charged with a quantity of energy;

during a first off-time of the first switch the quantity of energy is discharged from the inductor; and during a second off-time of the first switch the inductor remains discharged;

generating a first reference voltage that is inversely proportional to a sum of the on-time and the first off-time of the first switch; and controlling the on-time of the first switch in response to the first reference voltage such that the on-time is proportional to a ratio of a sum of the on-time and the first and second off-times to the sum of the on-time and the first off-time.

8. The method of claim 7, wherein generating the first reference voltage comprises:

generating a first voltage that is proportional to the sum of the on-time and the first off-time of the first switch;

generating a second voltage by comparing the input voltage to a second reference voltage; and generating the first reference voltage by setting equal the first voltage to the second voltage.

9. The method of claim 8, wherein generating the first voltage comprises:

generating a current signal corresponding to the first reference voltage; and transmitting the current signal to a second switch that is arranged to switch at a switching cycle that is proportional to sum of the on-time and the first off-time of the first switch.

10. The method of claim 9, wherein generating the first voltage further comprises:

generating a voltage signal corresponding to the first reference voltage; and transmitting the voltage signal to a first capacitor coupled to the second switch.

11. The method of claim 9, wherein the current signal is a first current signal and wherein generating the first current signal comprises:

generating a second current signal, by a transconductance amplifier, corresponding to the first reference voltage; and generating the first current signal, by a current mirror, corresponding to the second current signal.

12. The method of claim 8, wherein generating the second voltage comprises:

generating an inverse ratio of a square of the input voltage; and multiplying the inverse ratio of the square of the input voltage to a third voltage that corresponds to the input voltage.

13. The method of claim 7, wherein controlling the on-time of the first switch comprises:

generating a sawtooth signal; and comparing the sawtooth signal to the first reference voltage to generate a control signal for the first switch.

14. A method of operating a power factor correction (PFC) circuit, the method comprising:

receiving an input voltage at an input terminal;

controlling a current in an inductor via a first switch having a drain terminal, a source terminal and a gate terminal, wherein the inductor is coupled between the input terminal and the drain terminal and wherein:

during an on-time of the first switch the inductor is charged to a first energy state;

during a first off-time of the first switch the inductor is discharged to a second energy state; and during a second off-time of the first switch the inductor remains at the second energy state;

generating a first reference voltage that is inversely proportional to a sum of the on-time and the first off-time of the first switch; and controlling the on-time of the first switch in response to the first reference voltage such that the on-time is proportional to a ratio of a sum of the on-time and the first and second off-times to the sum of the on-time and the first off-time.

15. The method of claim 14, wherein generating the first reference voltage comprises:

generating a first voltage that is proportional to the sum of the on-time and the first off-time of the first switch;

generating a second voltage by comparing the input voltage to a second reference voltage; and generating the first reference voltage by setting equal the first voltage to the second voltage.

16. The method of claim 15, wherein generating the first voltage comprises:

generating a current signal corresponding to the first reference voltage; and transmitting the current signal to a second switch that is arranged to switch at a switching cycle that is proportional to sum of the on-time and the first off-time of the first switch.

17. The method of claim 16, wherein generating the first voltage further comprises:

generating a voltage signal corresponding to the first reference voltage; and transmitting the voltage signal to a first capacitor coupled to the second switch.

18. The method of claim 16, wherein the current signal is a first current signal and wherein generating the first current signal comprises:

generating a second current signal, by a transconductance amplifier, corresponding to the first reference voltage; and generating the first current signal, by a current mirror, corresponding to the second current signal.

19. The method of claim 15, wherein generating the second voltage comprises:

generating an inverse ratio of a square of the input voltage; and multiplying the inverse ratio of the square of the input voltage to a third voltage that corresponds to the input voltage.

20. The method of claim 14, wherein controlling the on-time of the first switch comprises:

generating a sawtooth signal; and

13

14 comparing the sawtooth signal to the first reference voltage to generate a control signal for the first switch.

* * * * *